US010640621B2

(12) United States Patent
Lebonte et al.

(10) Patent No.: US 10,640,621 B2
(45) Date of Patent: May 5, 2020

(54) MEMBRANE AND METHOD FOR PRODUCING THE MEMBRANE

(71) Applicant: GEMUE GEBR. MUELLER APPARATEBAU GMBH & CO. KOMMANDITGESELLSCHAFT, Ingelfingen (DE)

(72) Inventors: Christophe Lebonte, Niedernai (FR); Rolf Meier, Ettenheim (DE); Romain Ruocco, Holtzheim (FR)

(73) Assignee: GEMUE GEBR. MUELLER APPARATEBAU GMBH & CO. KOMMANDITGESELLSCHAFT, Ingelfingen (DE)

(*) Notice: Subject to any disclaimer, the term of this patent is extended or adjusted under 35 U.S.C. 154(b) by 0 days.

(21) Appl. No.: 15/941,152

(22) Filed: Mar. 30, 2018

(65) Prior Publication Data

US 2018/0282498 A1 Oct. 4, 2018

(30) Foreign Application Priority Data

Mar. 31, 2017 (EP) .................................. 17305393

(51) Int. Cl.

| | |
|---|---|
| *G06K 19/06* | (2006.01) |
| *C08J 5/18* | (2006.01) |
| *F16K 37/00* | (2006.01) |
| *G06K 19/077* | (2006.01) |
| *F16K 7/12* | (2006.01) |
| *F16J 3/02* | (2006.01) |
| *G06K 19/07* | (2006.01) |

(52) U.S. Cl.
CPC . *C08J 5/18* (2013.01); *F16J 3/02* (2013.01); *F16K 7/12* (2013.01); *F16K 37/0025* (2013.01); *F16K 37/0075* (2013.01); *G06K 19/0723* (2013.01); *G06K 19/07758* (2013.01); *C08J 2327/18* (2013.01)

(58) Field of Classification Search
CPC .. C08J 2327/18; C08J 5/18; F16J 3/02; F16K 37/0025; F16K 7/12; G06K 19/07; G06K 19/0723
USPC .......................................................... 235/492
See application file for complete search history.

(56) References Cited

U.S. PATENT DOCUMENTS

| | | | |
|---|---|---|---|
| 6,230,609 B1 | 5/2001 | Bender et al. | |
| 2007/0085112 A1* | 4/2007 | Yamazaki | ......... H01L 21/28008 257/288 |
| 2007/0106247 A1* | 5/2007 | Burnett | ..................... A61F 7/12 604/508 |

(Continued)

FOREIGN PATENT DOCUMENTS

| | | |
|---|---|---|
| CN | 105324596 A | 2/2016 |
| CN | 105431288 A | 3/2016 |

(Continued)

OTHER PUBLICATIONS

Chinese Office Action for Application 201810294038.2, dated April 3, 2019. pp. 1-6.

*Primary Examiner* — Thien M Le
(74) *Attorney, Agent, or Firm* — Bond Schoeneck & King, PLLC; George McGuire

(57) ABSTRACT

A membrane for a membrane valve is proposed. The membrane is produced from polytetrafluoroethylene, PTFE. An electronic data carrier is arranged between the membrane and a retaining layer.

9 Claims, 4 Drawing Sheets

(56) References Cited

U.S. PATENT DOCUMENTS

| | | | | |
|---|---|---|---|---|
| 2011/0196279 A1* | 8/2011 | Maierhofer | ............ | A61M 1/367 604/6.1 |
| 2011/0266353 A1* | 11/2011 | Binmore | .......... | G06K 19/07728 235/492 |
| 2012/0187197 A1* | 7/2012 | Masin | .............. | G06K 19/07758 235/492 |
| 2014/0305524 A1* | 10/2014 | Heizer | ...................... | F17D 5/00 137/551 |
| 2015/0158666 A1* | 6/2015 | Kruger | ............... | B65D 85/8043 426/87 |
| 2016/0003769 A1* | 1/2016 | Roundhill | ............ | G01N 27/122 436/120 |
| 2016/0144537 A1* | 5/2016 | Guimet | ................. | B29C 43/003 251/335.2 |
| 2016/0159535 A1* | 6/2016 | Diaz | ..................... | B65D 41/02 705/28 |

FOREIGN PATENT DOCUMENTS

| | | | |
|---|---|---|---|
| EP | 1058005 | A2 | 12/2000 |
| EP | 2749407 | A1 | 7/2014 |
| WO | 10082945 | A1 | 7/2010 |
| WO | 15010810 | A1 | 1/2015 |
| WO | 2016090073 | A1 | 6/2016 |
| WO | 16192970 | A1 | 12/2016 |

\* cited by examiner

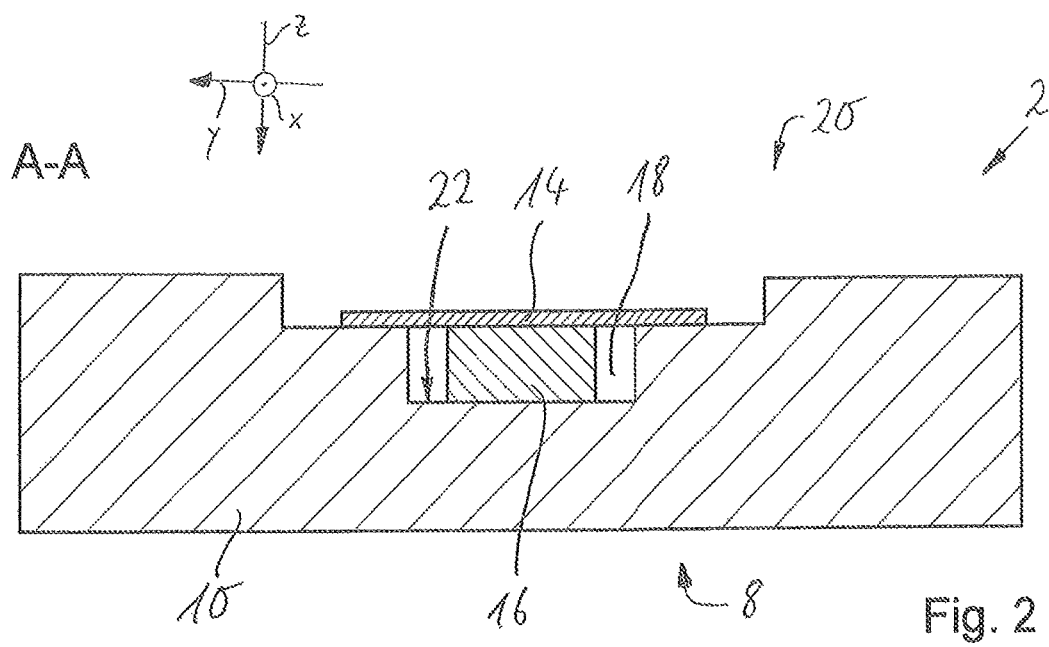
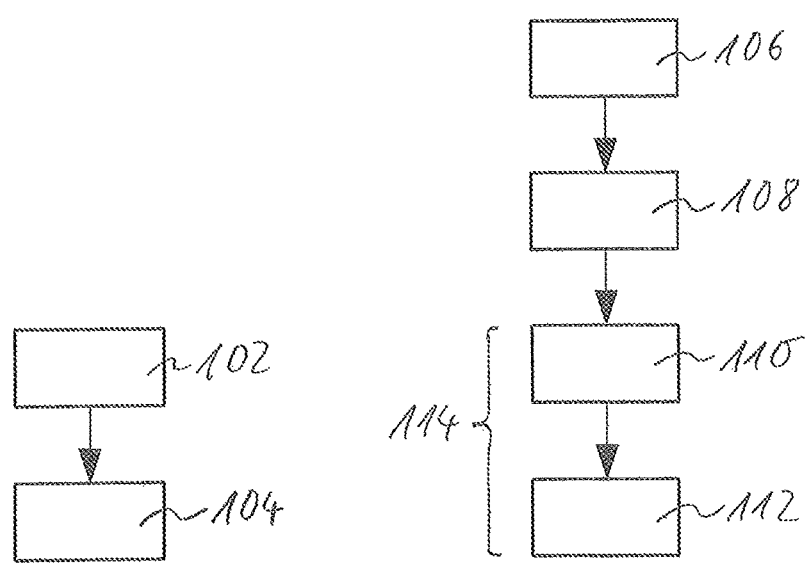

MEMBRANE AND METHOD FOR PRODUCING THE MEMBRANE

CROSS-REFERENCE TO RELATED APPLICATIONS

This application relates and claims priority to European Application No. EP17305393.5-1751, filed Mar. 31, 2017, the entire disclosure of which is incorporated herein by reference.

BACKGROUND OF THE INVENTION

The invention relates to a membrane for a membrane valve, and to a method for producing the membrane according to the preamble of an independent claim.

Membrane valve membranes that are produced from polytetrafluoroethylene, PTFE, are generally known. Said material has a low surface tension, which means it is used in particular in chemical applications.

There is a simultaneous need on the part of both customers and manufacturers for individual PTFE membranes to be traceable.

In addition, it is known that, in order to produce the membrane, the PTFE material is subjected to a high temperature, in particular in the range of from 370-380° C., for a period of several hours. Electronic data carriers are generally not suitable for being inserted into the PTFE material under such production conditions, since these conditions can lead to said carriers becoming damaged or destroyed.

SUMMARY OF THE INVENTION

The aim of the invention is therefore to make it possible for PTFE membranes to also be traceable.

The proposed membrane is characterized in that an electronic data carrier is arranged between the membrane comprising PTFE and a retaining layer. The traceability of the membrane is made possible on account of the electronic data carrier secured to the membrane by means of the retaining layer.

One advantageous embodiment is characterized in that the membrane includes a first recess in which the electronic data carrier is housed, at least in portions, and of which the opening is closed by the retaining layer. Therefore, shaping the membrane already contributes to securing the electronic data carrier. At the same time, the electronic data carrier is arranged in the recess so as to be protected from damage.

One advantageous development is characterized in that the opening in the first recess is located on a side that is remote from the media side of the membrane. The risk of contact between the electronic data carrier and the process medium is thus advantageously reduced.

One advantageous development is characterized in that the first recess is arranged within a second recess in the membrane, the second recess providing a connection surface around the opening in the first recess, and the retaining layer being connected to the connection surface. The connection surface therefore springs back relative to the surface of the membrane, and the connection between the retaining layer and the membrane is thus protected from damage.

One advantageous development is characterized in that the first recess is arranged in a tab that projects from a narrow side of the membrane. This results in the electronic data carrier being physically separated from other functional regions of the membrane, and it being easier for the user to read from the electronic data carrier.

One advantageous embodiment is characterized in that the retaining layer is integrally bonded to the membrane. Advantageously, the integral bond leads to the electronic data carrier being secured in a fluid-tight manner.

One advantageous embodiment is characterized in that the retaining layer includes a perfluoroalkoxy polymer, PFA. Said material advantageously has the property of being integrally bondable to the PTFE.

One advantageous embodiment is characterized in that an RFID chip (RFID=radio frequency identification) is present as the electronic data carrier.

One advantageous development is characterized in that the RFID chip is disk-shaped.

One advantageous development is characterized in that a disk surface of the RFID chip is oriented in a plane that is parallel to a membrane plane or in the membrane plane. This advantageously contributes to a compact design of the membrane, which has an advantageous impact on the production thereof.

The proposed method for producing a membrane for a membrane valve is characterized in that an electronic data carrier is arranged between the membrane and a retaining layer.

One advantageous embodiment is characterized in that the method includes: producing the membrane having a recess; arranging the electronic data carrier in the recess; and closing the recess having the electronic data carrier arranged therein by means of the retaining layer. In this way, the electronic data carrier can be secured to the membrane despite the low surface tension of the PTFE membrane.

One advantageous development is characterized in that closing the recess includes: arranging the retaining layer between a pressing tool and a connection surface of the membrane, and pressing the pressing tool by means of pressing pressure and at a pressing temperature, the pressing tool comprising a pressing surface corresponding to the connection surface.

One advantageous development is characterized in that, in order to press the pressing tool, a removable protective film, in particular consisting of a polyimide film, in particular consisting of Kapton, is temporarily arranged between the retaining layer and the pressing tool. This prevents the retaining layer from adhering to the pressing surface of the pressing tool.

BRIEF DESCRIPTION OF THE DRAWINGS

Further features and advantages of the invention can be found in the following description of embodiments, which are explained with references to the drawings, in which:

FIGS. 2, 3, 4, 5 and 6 are schematic cross sections from FIG. 1; and

FIGS. 7 and 8 each schematically show a flow diagram.

DETAILED DESCRIPTION

Figure 1:
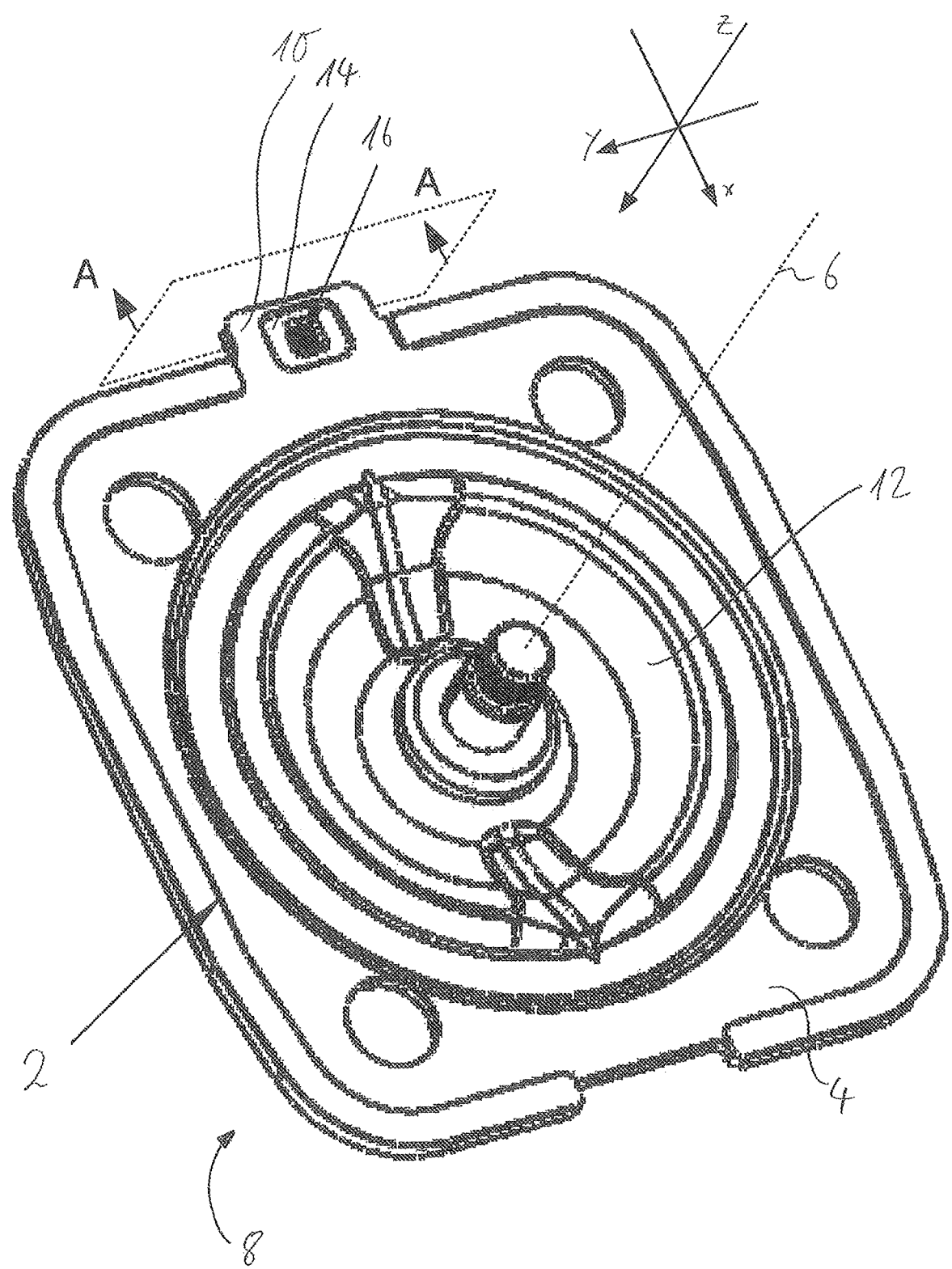
FIG. 1 schematically shows a membrane for a membrane valve in perspective view.

In FIG. 1, a membrane for a membrane valve is provided as a whole with reference sign 2. The body of the membrane 2 is produced from polytetrafluoroethylene, PTFE. The membrane 2 is provided for being arranged between a drive body and a valve body of the membrane valve. In a radially outer clamping portion 4, the membrane is 2 is clamped in a fluid-tight manner between the drive body and the valve body. The membrane 2 is moved along a feed axis 6. The membrane 2 is rotationally symmetrical about the feed axis 6. When being moved along the feed axis 6, the membrane 2 causes a fluid channel in the valve body to open or close. In this regard, a medium side 8 of the membrane 2 is in contact with the process fluid.

The membrane 2 spans a membrane plane in parallel with an xy plane. The membrane 2 comprises a tab 10 that projects in the membrane plane from a narrow side of the membrane 2. A working portion 12 of the membrane 2, provided for moving the membrane 2, is arranged radially inside the clamping portion 4. The tab 10, however, is arranged radially outside the clamping portion 4. An electronic data carrier 16, in particular a radio frequency identification, RFID, chip is arranged between the membrane 2 and a film-like retaining layer 14. The electronic data carrier 16 is planar, in particular disk-shaped, and is positioned, together with the plane spanned thereby, substantially in the membrane plane or in a tab plane.

FIG. 2 is a schematic cross section through A-A in FIG. 1. The electronic data carrier 16 is arranged in a first recess 18, the opening of which is closed in a fluid-tight manner by the retaining layer 14. The first recess 18 is arranged on a side 20 of the membrane 2 that is opposite the medium side 8. The electronic data carrier 16 is form-fittingly secured in the z direction by means of a base 22 of the first recess 18 and the retaining layer 14, which can also be designed as a film. The retaining layer 14 is preferably under tension and pushes the electronic data carrier 16 in the z direction, resulting in a frictional fit in an xy plane. The retaining layer 14 therefore secures the electronic data carrier 16 with respect to the tab 10.

Figure 3:
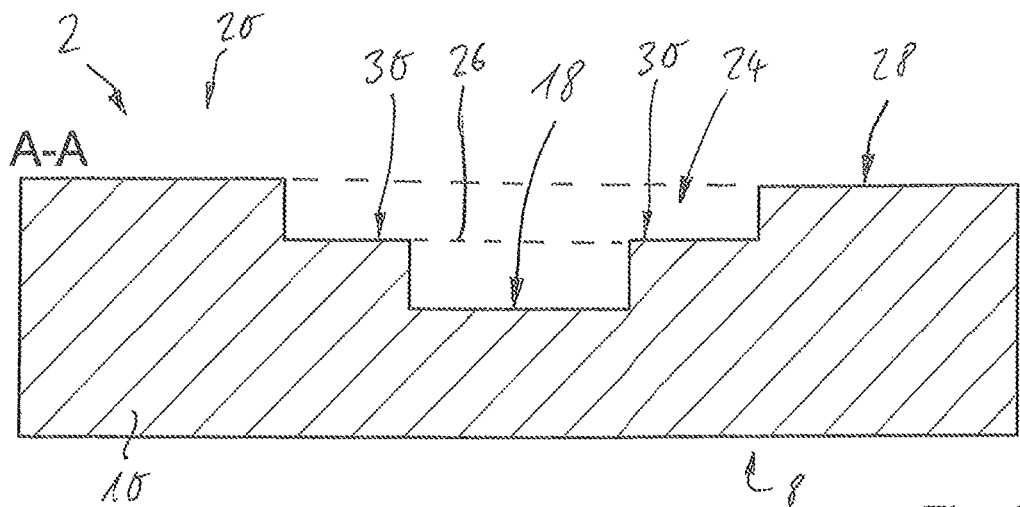

FIG. 3 is a schematic cross section through A-A in FIG. 1 showing a production step without the electronic data carrier 16 and without the retaining layer 14. The production step shown includes shaping the PTFE material. The first recess 18 is located within a second recess 24. The second recess 24 provides, around the opening 26 in the first recess 18, a connection surface 30 for connecting to the retaining layer 14, which surface springs back relative to a surface 28 of the tab 10.

Figure 4:
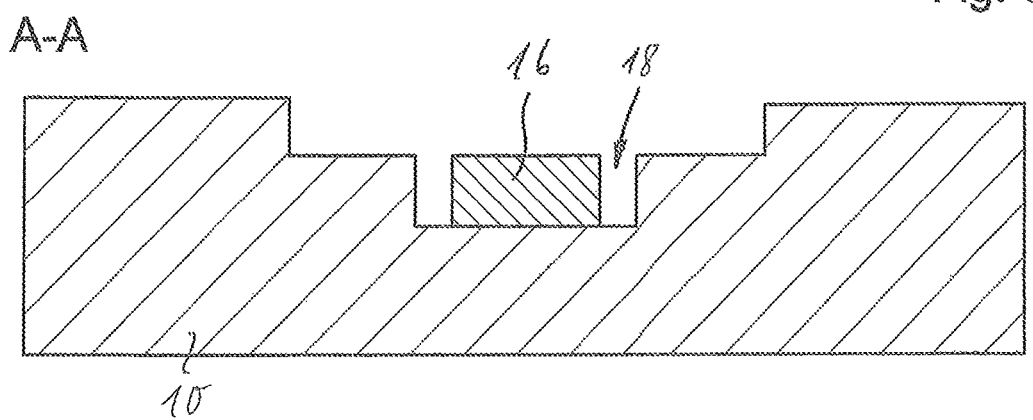

FIG. 4 shows a further production step in which the electronic data carrier 16 is inserted in the first recess 18.

Figure 5:
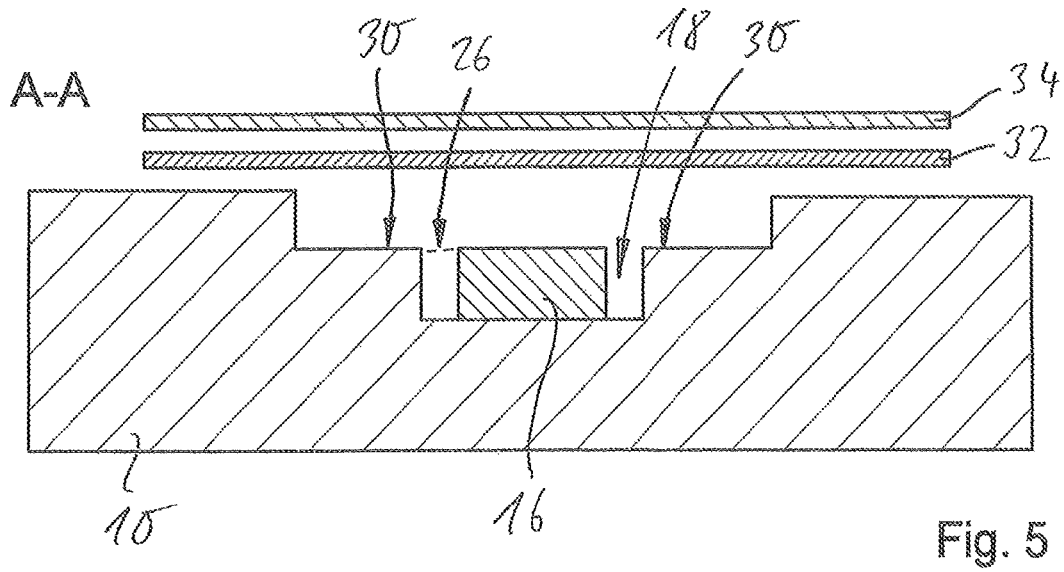

FIG. 5 schematically shows a further production step in a cross section through A-A in FIG. 1. The opening 26 in the first recess 18 is covered by a first layer 32 and a second layer 34. The first layer 32 subsequently forms the retaining layer 14. The second layer 34 is used as a temperature protection layer for the production step shown in FIG. 6. The two layers 32 and 34 cover the first opening 26 and also at least the connections surface 30.

Figure 6:
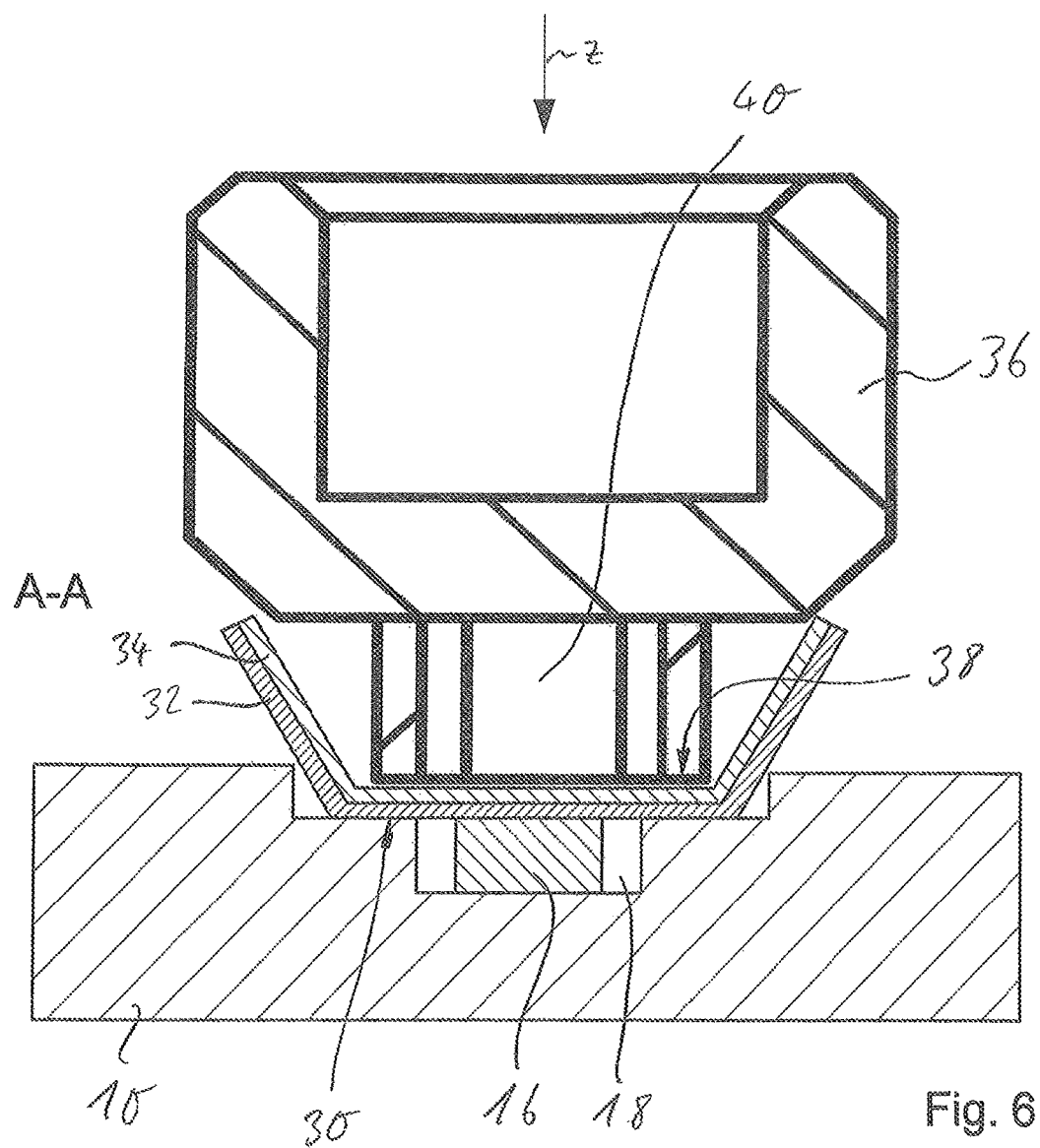

FIG. 6 schematically shows a further production step in a cross section through A-A in FIG. 1. A pressing tool 36 comprises a pressing surface 38 corresponding to the connection surface 30. The pressing surface 38 defines an inner cavity 40. After arranging the layers 32 and 34, the pressing surface 38 is pressed onto the second layer 34 for a period of 10 seconds at approximately 400° C., the pressing surface 38 covering the connection surface 30. For this purpose, the pressing tool comprises a heating element (not shown). The heating and pressing by the pressing tool 36 results in the layer 32 being integrally bonded to the PTFE material of the tab 10 in the region of the connection surface 30. The electronic data carrier 16 is then enclosed in the first recess 18 in a fluid-tight manner. The pressing tool 36 is subsequently removed, counter to the z direction. Any remaining excess of the layer 32 can be removed on account of the integral bonding of the first layer 32 to the tab 10, resulting in the retaining layer 14 as shown in FIG. 2.

The cavity 40 prevents the high connection temperature of approximately 400° C. being directly transferred to the electronic data carrier 16. The second layer 34 is a polyimide film, in particular consisting of Kapton (Kapton is a registered trademark of E.I. DU PONT DE NEMOURS AND COMPANY). In an alternative or additional embodiment, the pressing surface 38 may additionally comprise a non-stick coating, meaning that the second layer 34 can be omitted during production.

FIG. 7 schematically shows a flow diagram. The membrane 2 is produced in a first step 102. The electronic data carrier 16 is arranged between the membrane 2 and the retaining layer 14 in a second step 104.

FIG. 8 schematically shows a further flow diagram. The membrane 2 having the recess 18 is produced from PTFE in a third step 106. The electronic data carrier 16 is arranged in the recess 18 in a fourth step 108. The layer 32 or the retaining layer 14 is arranged between the pressing tool 36 and the connection surface 30 in a fifth step 110. The pressing tool 36 is pressed towards the tab 10 in the region of the connection surface 30 by means of pressing pressure and at the pressing temperature in a sixth step 112. The two steps 110 and 112 can also be designated as the production step 114 for closing the recess 18.

What is claimed is:

1. Membrane for a membrane valve, the membrane being produced from polytetrafluoroethylene, characterized in that an RFID chip is arranged between the membrane and a retaining layer, wherein the membrane includes a first recess in which the electronic data carrier is housed, at least in portions, and of which the opening is closed by the retaining layer, and wherein the first recess is arranged within a second recess in the membrane, wherein the second recess provides a connection surface around the opening in the first recess, and wherein the retaining layer is connected to the connection surface.

2. Membrane according to claim 1, wherein the opening in the first recess is located on a side that is remote from a media side of the membrane.

3. Membrane according to claim 1, wherein the first recess is arranged in a tab that projects from a narrow side of the membrane.

4. Membrane according to claim 1, wherein the retaining layer is integrally bonded to the membrane.

5. Membrane according to claim 1, wherein the retaining layer includes a perfluoroalkoxy polymer, PFA.

6. Membrane according to claim 1, wherein the RFID chip is disk-shaped.

7. Membrane according to claim 6, wherein a disk surface of the RFID chip is oriented in a plane that is parallel to a membrane plane or in the membrane plane.

8. Method for producing a membrane for a membrane valve, comprising the steps of:
producing the membrane from polytetrafluoroethylene,
arranging an RFID chip between the membrane and a retaining layer,
producing the membrane having a first recess;
arranging the electronic data carrier in the first recess; and
closing the first recess having the electronic data carrier arranged therein by means of the retaining layer, wherein closing the first recess includes:
arranging the retaining layer between a pressing tool and a connection surface of the membrane, and
pressing the pressing tool by means of pressing pressure and at a pressing temperature, wherein the pressing tool comprises a pressing surface corresponding to the connection surface.

9. Method according to claim 8, wherein, in order to press the pressing tool, a removable protective film, in particular consisting of a polyimide film, in particular consisting of Kapton, is temporarily arranged between the retaining layer and the pressing tool.

* * * * *